Ū USOO6151193A

United States Patent [19]
Terunuma et al.

[11] Patent Number: 6,151,193
[45] Date of Patent: *Nov. 21, 2000

[54] THIN FILM MAGNETIC HEAD

[75] Inventors: Koichi Terunuma, Hohya; Yasufumi Uno, Usudamachi; Tetsuya Mino, Hunabashi; Koji Matsukuma, Akashi, all of Japan

[73] Assignee: TDK Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/058,894

[22] Filed: Apr. 13, 1998

[30] Foreign Application Priority Data

May 27, 1997 [JP] Japan ..................... 9-137019

[51] Int. Cl.$^7$ ................ G11B 5/31; G11B 5/39; G11B 5/187
[52] U.S. Cl. ................ 360/126; 360/119; 360/317
[58] Field of Search .................... 360/113, 119, 360/120, 122, 125, 126, 317

[56] References Cited

U.S. PATENT DOCUMENTS

| | | | |
|---|---|---|---|
| 4,631,612 | 12/1986 | Shiiki et al. | 360/125 |
| 4,943,879 | 7/1990 | Takano et al. | 360/126 |
| 5,099,376 | 3/1992 | Ino et al. | 360/120 |
| 5,126,907 | 6/1992 | Hamakawa et al. | 360/126 |
| 5,157,570 | 10/1992 | Shukovsky et al. | 360/126 |
| 5,168,409 | 12/1992 | Koyama et al. | 360/113 |
| 5,224,002 | 6/1993 | Nakashima et al. | 360/126 |
| 5,285,340 | 2/1994 | Kochan et al. | 360/119 |
| 5,438,747 | 8/1995 | Krounbi et al. | 29/603 |
| 5,452,164 | 9/1995 | Cole et al. | 360/113 |
| 5,558,944 | 9/1996 | Terunuma | 428/611 |
| 5,590,008 | 12/1996 | Tanabe et al. | 360/126 |
| 5,606,478 | 2/1997 | Chen et al. | 360/126 |
| 5,652,687 | 7/1997 | Chen et al. | 360/126 |
| 5,726,841 | 3/1998 | Tong et al. | 360/122 |
| 5,751,526 | 5/1998 | Schemmel | 360/113 |
| 5,812,350 | 9/1998 | Chen et al. | 360/126 |
| 5,828,533 | 10/1998 | Ohashi et al. | 360/126 |
| 5,850,325 | 12/1998 | Miyauchi et al. | 360/113 |

FOREIGN PATENT DOCUMENTS

| | | |
|---|---|---|
| 6-28626 | 2/1994 | Japan . |
| 7-225917 | 8/1995 | Japan . |
| 7-262519 | 10/1995 | Japan . |

*Primary Examiner*—William J. Klimowicz
*Attorney, Agent, or Firm*—Oblon, Spivak, McClelland, Maier & Neustadt, P.C.

[57] ABSTRACT

A first pole tip 212 at a write element 2 is provided projecting above a first yoke 211. A second pole tip 222 is adhered onto a gap film 23 that is adhered onto the first pole tip 212. The front end portion of a second yoke 221 is laminated on the second pole tip 222. At least either the first pole tip 212 or the second pole tip 222 is constituted of a material having a higher saturation magnetic flux density than that of permalloy. At least either the first yoke 211 or the second yoke 221 is constituted of a material having a higher resistivity than that of permalloy.

4 Claims, 10 Drawing Sheets

THIN FILM MAGNETIC HEAD

BACKGROUND OF THE INVENTION

1. Field of the Invention

The present invention relates to a thin film magnetic head.

2. Discussion of Background

In recent years, most thin film magnetic heads that are employed in magnetic disk apparatuses constituting storage systems for computers, are combined type thin film magnetic heads having a thin film write element and a magnetoresistive (hereafter referred to as MR) read element, which achieves a high degree of resolution without depending upon its speed relative to the magnetic disk. Such magnetic head includes a first shield film, a second shield film and an MR element. The first shield film and the second shield film are separated over a distance from each other via an appropriate non-magnetic insulator, with the MR element provided between the first shield film and the second shield film.

An inductive electromagnetic transducer is employed as a write element, and is laminated on the MR read element. The inductive thin film magnetic transducer constituting the write element is provided with a first magnetic film that also functions as the second shield film for the MR read element, a second yoke, a gap film and a coil film supported by an insulating film constituted of an organic resin and the like.

The front ends of the first magnetic film and the second yoke respectively, constitute a first pole tip and a second pole tip that face opposite each other over the gap film having a very small thickness, and write is performed at the first pole tip and the second pole tip. The yoke of the first magnetic film and the second magnetic film are linked with each other at the back gap portion located at the opposite side from the first pole tip and the second pole tip, to complete the magnetic circuit. The coil film is formed wound around the linking area of the yoke in a coil.

In order to achieve a high recording density by employing this type of thin film magnetic head, the quantity of data stored per unit area of the magnetic disk (surface density) must be improved. Improvement in the surface density, as well as improvement in the performance of the write element, is achieved by improving the performance of the magnetic recording medium such as a magnetic disk, and through operating the write circuit at a higher frequency.

One of the means that may be employed to improve the surface density by improving the capability of the write element is to reduce the length of the gap between the poles. However, there is a limit to how much the gap can be reduced, since such a reduction results in a reduction in the magnetic flux intensity between the poles.

Another means that may be employed to improve the surface density by improving the capability of the write element is to increase the number of data tracks in which data can be recorded at the magnetic disk. Normally, the number of tracks that can be recorded at a magnetic disk is expressed as TPI (tracks per inch). The TPI capability of a write element can be improved by reducing the head dimensions that determine the data track width. This head size is normally referred to as the head track width.

Since the first magnetic film at the write element is also used as the second shield film of the MR read element in a conventional thin film magnetic head in the prior art described above, the track width of the first pole tip cannot be reduced, and thus, a rather large side fringing magnetic field is generated during recording. This magnetic field is caused by a leak of the magnetic flux from the second pole tip where the track width has been reduced to the first magnetic film where the track width has not been reduced. Such a side fringing magnetic field places a limit on how much reduction can be achieved for the minimum track width and ultimately places a limit on the degree of improvement in track density that can be achieved. It also degrades the off-track performance when the track data that have been written are read by the MR element.

As a means for solving the problems discussed above, Japanese Unexamined Patent Publication No. 262519/1995 and Japanese Unexamined Patent Publication No. 225917/1995 disclose a means for matching the track width at the first pole tip with the narrow track width at the second pole tip through ion beam milling.

Japanese Unexamined Patent Publication No. 28626/1994 discloses two manufacturing methods. In the first manufacturing method, after forming a first magnetic yoked layer (first yoke), a photoresist layer is applied and then an opening portion is formed at the photoresist layer for pattern forming a magnetic pole end assembly comprising a first pole tip, a gap film and a second pole tip. Next, after forming the magnetic pole end assembly at the opening portion, the photoresist layer located at the front portion of the magnetic pole end assembly is removed. Then, hard baking is performed on the photoresist layer to form a flattened insulating layer. After this, a coil structure, an insulating film and the like are constituted by employing a method in the prior art, and then a second magnetic yoked layer (second yoke) is formed.

In the second method, after a first magnetic yoked layer (first yoke) is formed, a photoresist layer is applied, an opening portion is formed at the photoresist layer for pattern forming a magnetic pole end assembly comprising a first pole tip, a gap film and a second pole tip and the magnetic pole end assembly is formed within the opening portion. After this, a coil structure, an insulating film and the like are constituted, and then a second magnetic yoked layer (second yoke) is formed.

However, the publications of the prior art mentioned above only disclose a technology for improving the surface density by reducing the pole width at the write element, and do not disclose the structure of a thin film magnetic head that achieves superior performance when recording onto a magnetic recording medium having a high coercive force. In addition, they do not disclose a means for prevention of eddy current loss and the like required when the write circuit operates at a higher frequency.

SUMMARY OF THE INVENTION

It is an object of the present invention to provide a thin film magnetic head that is capable of achieving high density recording by preventing the generation of a side fringing magnetic field and improving the track density.

It is a further object of the present invention to provide a high performance thin film magnetic head that assures ample recording performance when used with a magnetic recording medium having a high coercive force.

It is a further object of the present invention to provide a high performance thin film magnetic head that minimizes the eddy current loss in the high frequency range.

In order to achieve the objects described above, in the thin film magnetic head according to the present invention, the first magnetic film at the write element includes a first yoke and a first pole tip, with the first pole tip provided projecting above the first yoke.

The second magnetic film at the write element includes a second pole tip and a second yoke. The second pole tip is adhered onto the gap film which is adhered onto the first pole tip, and the front end portion of the second yoke is laminated on the second pole tip.

At least either the first pole tip or the second pole tip is constituted of a material having a higher saturation magnetic flux density than that of permalloy.

The second pole tip of the write element faces opposite the first pole tip, separated from it by a gap film, and it has a track width which is essentially equal to the track width of the first pole tip. This prevents generation of a side fringing magnetic field and increases the track density, thereby achieving high density recording.

In this type of write element in the prior art, the first pole tip and the second pole tip are both constituted of permalloy. According to the present invention, at least either the first pole tip or the second pole tip is constituted of a material having a higher saturation magnetic flux density than that of permalloy. Consequently, unlike a write element in the prior art employing only permalloy, ample recording performance is achieved with a magnetic recording medium having a high coercive force.

At least either the first yoke or the second yoke may be constituted of a material having a higher resistivity than that of permalloy. As a result, compared to a write element in the prior art employing only permalloy, the eddy current loss occurring when the write circuit is operated at a higher frequency can be reduced.

Selection can be made from a group of various materials having higher saturation magnetic flux densities than that of permalloy to be used as the high saturation magnetic flux density material that constitutes at least either the first pole tip or the second pole tip. There are a number of such materials. Both the first pole tip and the second pole tip may be constituted of the high saturation magnetic flux density material described above, or only either one of them may be constituted of the high saturation magnetic flux density material.

Selection can be made from a group of various materials having higher resitivities than that of permalloy to be used as the high resistivity material that constitutes at least either the first yoke or the second yoke. There are a number of such materials. Both the first yoke and the second yoke may be constituted of the high resistivity material described above, or only either one of them may be constituted of the high resistivity material.

The thin film magnetic head according to the present invention normally includes an MR read element. The MR read element includes a first shield film, a second shield film and an MR element, with the first shield film and the second shield film separated from each other over a distance, and the MR element positioned between the first shield film and the second shield film.

The write element is laminated on the MR read element. In this structure, the second shield film is also used as the first yoke of the write element. Since the first pole tip is provided projecting above the first yoke, the track width of the first pole tip can be reduced while maintaining the width of the second shield film at the dimension that is required in order to protect the MR read element.

BRIEF DESCRIPTION OF THE DRAWINGS

These and other advantages, features and objects of the present invention will be understood by those of ordinary skill in the art referring to the annexed drawings, given purely by way of non-limited example, in which.

DETAILED DESCRIPTION OF THE PREFERRED EMBODIMENTS

Figure 1:
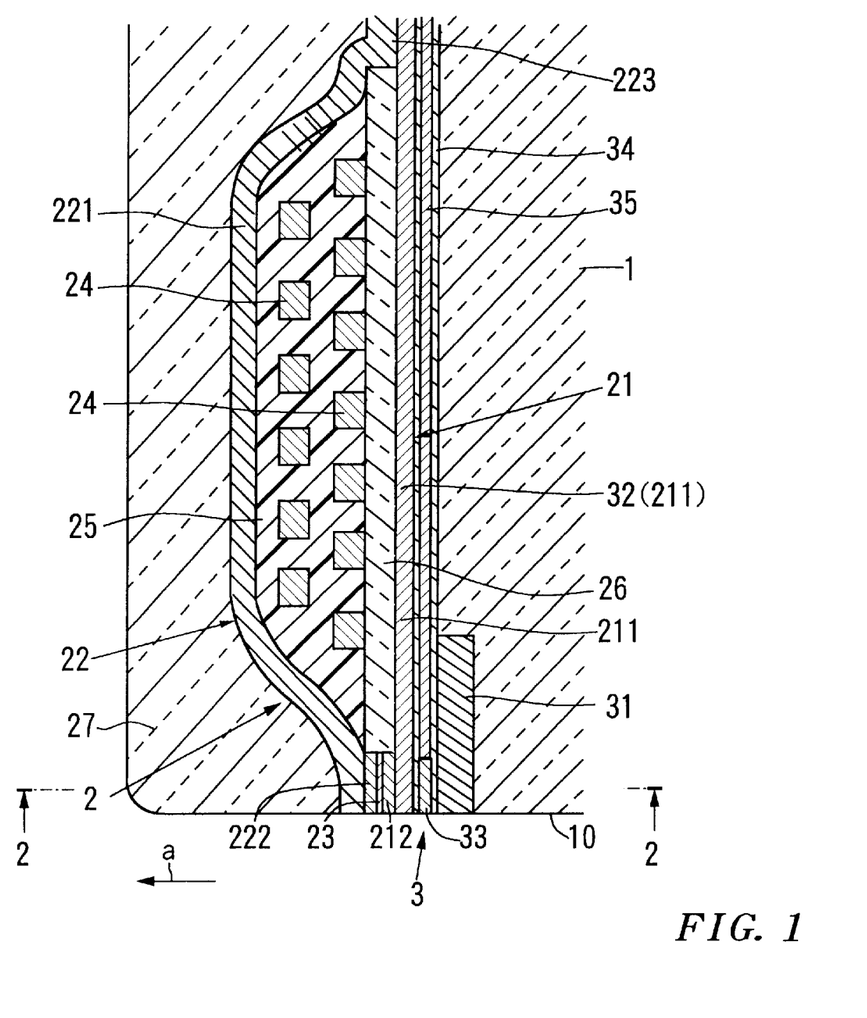
FIG. 1 is a cross section of the thin film magnetic head according to the present invention.
Figure 2:
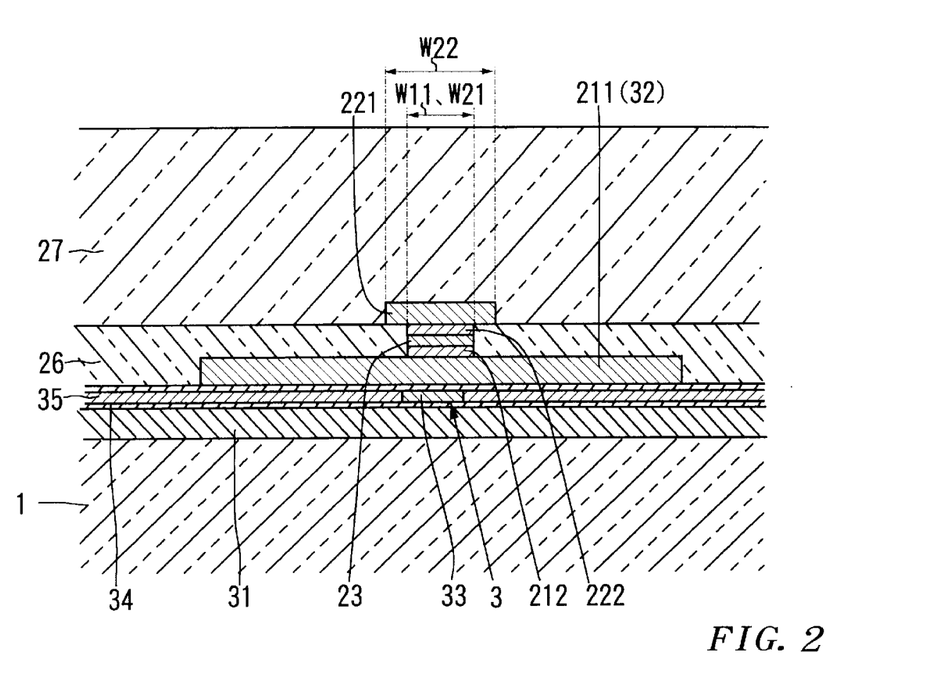
FIG. 2 is a cross section through line 2—2 in FIG. 1
Figure 3:
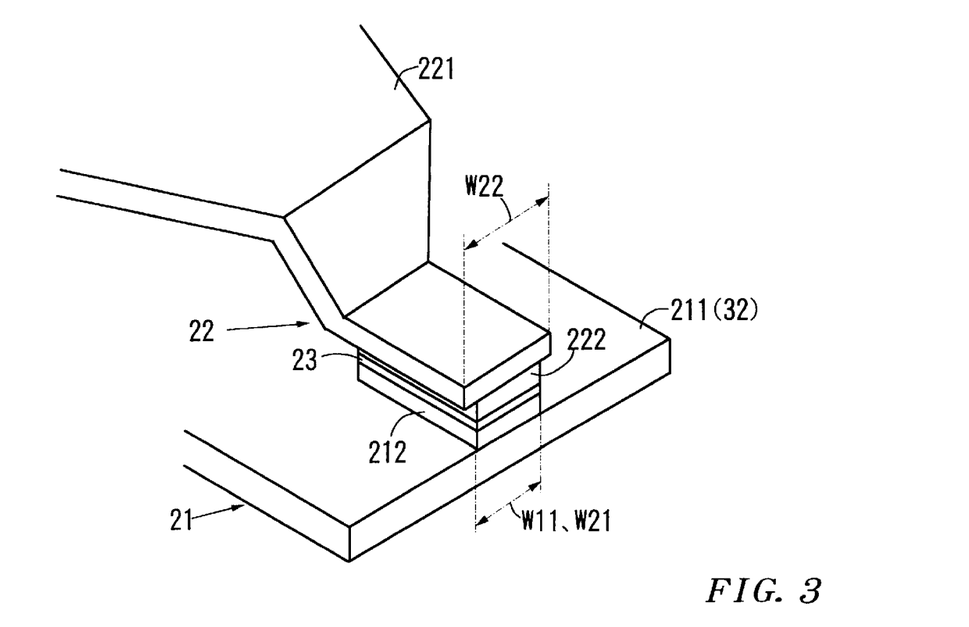
FIG. 3 is an enlarged perspective of the pole tips in the thin film magnetic head shown in FIGS. 1 and 2.

Referring to FIGS. 1 to 3, a combined type thin film magnetic head which is provided with both a write element 2 and an MR read element 3 is disclosed. The write element 2 and the MR read element 3 are disposed onto a body 1 which is used as a slider, with the read/write area positioned at an air bearing surface 10 of the body 1. The arrow a indicates the direction in which air flows when the thin film magnetic head is operated in combination with a rotating magnetic recording medium. Dimensions in FIGS. 1 to 3 are exaggerated.

The write element 2, which is an inductive thin film magnetic transducer, is laminated on the MR read element 3. The write element 2 includes a first magnetic film 21, a second magnetic film 22, a gap film 23 and a coil film 24 which is supported by an insulating film 25 constituted of an organic resin such as Novolak resin. The first magnetic film 21 includes a first yoke 211 and a first pole tip 212, with the first pole tip 212 adhered projecting above the first yoke 211. The first pole tip 212 has a narower track width than the track width of the first yoke 211. The gap film 23 is constituted of a conductive non-magnetic material such as Au, Cu, NiP or the like.

The second magnetic film 22 includes a second pole tip 222 and a second yoke 221. The second pole tip 222 is adhered onto the gap film 23 which is adhered on the first pole tip 212, with its track width W21 being essentially equal to the track width W11 of the first pole tip 212.

A non-magnetic insulating film 26 fills the area around the first pole tip 212, the second pole tip 222 and the gap film 23. The upper surface of the non-magnetic insulating film 26 is flattened, and this flattened upper surface forms a flat surface which is essentially the same as the surface of the second pole tip 222. The non-magnetic insulating film 26 may be constituted of AlO, SiO or the like. Reference number 27 indicates a protective film that covers the entire structure, which is constituted of AlO, SiO or the like.

The second yoke 221 with its front end portion having a track width W22 that is larger than the track width W21 of the second pole tip 222 is laminated on the second pole tip 222, and its two ends in the direction of the track width are adhered on the upper surface of the non-magnetic insulating film 26. The insulating film 25 supporting the coil film 24 is formed over the upper surface of the non-magnetic insulating film 26.

The yokes 211 and 221 of the first magnetic film 21 and the second magnetic film 22 are linked with each other to complete to magnetic circuit at a linking area 223 located at the rear on the opposite side from the first pole tip 212 and the second pole tip 222. The coil film 24 is formed on the insulating film 25 wound around the linking area 223 in a coil. The number of turns and the number of layers of the coil film 24 are arbitrary.

At least either the first pole tip 212 or the second pole tip 222 is constituted of a material having a higher saturation magnetic flux density than that of permalloy. Any material having a higher saturation magnetic flux density than that of permalloy may be used as the high saturation magnetic flux density material to constitute at least either the first pole tip 212 or the second pole tip 222. For instance, at least one of the following, i.e., Fe—Co, Fe—M and Fe—Co—M, may be selected. It is to be noted that M indicates at least one material selected from N, C, B, Si, Al, Ti, Zr, Hf, Mo, Ta and Nb (all chemical symbols). Both the first pole tip 212 and the second pole tip 222 may be constituted of the high saturation magnetic flux density material described above or only one of them may be constituted of the high saturation magnetic flux density material.

At least either the first yoke 211 or the second yoke 221 is constituted of a material having a higher resistivity in comparison with that of permalloy. Any material having a higher resistivity than that of permalloy may be used as the high resistivity material to constitute at least either the first yoke 211 or the second yoke 221. A specific example of such a high resistivity material is at least one of the following materials, i. e.,Fe—Co group amorphous, Fe—M—N, Fe—M—O, Fe—Co—M—N, Fe—Co—M—O and Fe—Co—N. It is to be noted that M indicates at least one material selected from B, Si, Al, Ti, Zr, Hf, Mo, Ta and Nb (all chemical symbols). Both the first yoke 211 and the second yoke 221 may be constituted of the high resistivity material described above or only one of them may be constituted of the high resistivity material.

The MR read element 3 includes a first shield film 31, a second shield film 32, an MR element 33 and a lead conductive film 35, The first shield film 31 and the second shield film 32 are separated from each other over a distance, and the MR element 33 is provided between the first shield film 31 and the second shield film 32. The second shield film 32 constitutes the first yoke 211 of the write element 2. An inorganic insulating film 34 is provided between the first shield film 31 and the second shield film 32, and the MR element 33 and the lead conductive film 35 are provided inside the inorganic insulating film 34.

As described above, the second pole tip 222 of the write element 2 faces opposite the first pole tip 212, separated from it by the gap film 23, and it has a track width W21 which is essentially equal to the track width W11 of the first pole tip 212. This prevents generation of a side fringing magnetic field and increases the track density, thereby achieving high density recording.

At least either the first pole tip 212 or the second pole tip 222 is constituted of a material having a higher saturation magnetic flux density than that of permalloy. Consequently, unlike a write element in the prior art employing only permalloy, ample recording performance is achieved on a magnetic recording medium having a high coercive force.

Moreover, at least either the first yoke 211 or the second yoke 221 is constituted of a material having a higher resistivity than that of permalloy. As a result, compared to a write element in the prior art employing only permalloy, the eddy current loss occurring when the write circuit is operated at a higher frequency can be reduced.

Next, advantages achieved by the present invention are explained in specific terms in reference to embodiments and an example for comparison. Table I presents the saturation magnetic flux density Bs and the resistivity ρ of the materials used.

TABLE I

| Material | Bs (kG) | ρ (μ Ω cm) |
| --- | --- | --- |
| NiFe | 9.0 | 22 |
| FeZrN | 16.0 | 100 |
| FeN | 20.0 | 40 |
| CoZrNbO | 12.0 | 160 |

As Table I indicates, the values representing the saturation magnetic flux densities Bs and the resistivities ρ of FeZeN, FeN and CoZrNbO are all higher than those of the permalloy (NiFe) that is used to constitute pole tips in a write element in the prior art, and therefore, they are examples of suitable materials that may be used in the present invention.

Write elements having a recording track width of 2 μm were formed by using the materials presented in Table I. The film thickness of the first pole tip 212 and the second pole tip 222 was set at 0.5 μm, the film thickness of the first yoke 211 and the second yoke 221 was set at 3.0 μm and the film thickness of the gap film 23 was set at 0.2 μm. Magnetic recording was performed using these write elements on a magnetic disk having a coercive force of 2800 (Oe), 50 (G) and reproduction was performed by a read element. The read element was constituted of an MR element having a reproduction gap of 0.15 μm and a track width of 1.5 μm. The overwrite characteristics OW (dB) and D50 (kFCI) thus achieved are presented in Table II.

TABLE II

| | First magnetic film 21 | | Second magnetic film 22 | | Head characteristics | |
| --- | --- | --- | --- | --- | --- | --- |
| | Yoke | Pole tip | Pole tip | Yoke | OW (dB) | D50 (kFCI) |
| Embodiment 1 | NiFe | FeZrN | FeZrN | NiFe | 36 | 155 |
| Embodiment 2 | FeZrN | FeZrN | FeZrN | FeZrN | 38 | 160 |
| Embodiment 3 | CoZrNbO | FeN | FeN | CoZrNbO | 40 | 165 |
| Example for comparison 1 | NiFe | NiFe | NiFe | NiFe | 30 | 145 |

In Table II, D50 which is known by those skilled in the art as the half value width, represents flux changes per inch (kFCI) at 50% of a peak value measured on a read-out wave form.

As Table II indicates, embodiments 1, 2 and 3 achieve superior overwrite characteristics and superior D50 values to those achieved by the example for comparison and through them a high performance thin film magnetic head that is capable of demonstrating ample recording performance on a magnetic recording medium having a high coercive force and reducing the eddy current loss in the high frequency range is obtained.

The advantages of the embodiments are further explained. First, since the second yoke 221 is laminated on the second pole tip 222 with its front end portion having a larger track width W22 than the track width W21 of the second pole tip 222, the write capability does not deteriorate even when the track width W21 of the second pole tip 222 is reduced.

Moreover, since the second yoke 221 is not formed at the time when the second pole tip 222 is formed but is instead laminated on the second pole tip 222, the second yoke 221 can be formed after forming the second pole tip 222 by ensuring that its track width is equal to those of the first pole tip 212 and the gap film 23 (W21=W11). As explained later, this structure achieves a number of advantages during production.

The non-magnetic insulating film 26 fills the area around the first pole tip 212, the second pole tip 222 and the gap film 23. The upper surface of the non-magnetic insulating film 26 is flattened, and this flattened upper surface forms a flat surface which is essentially the same as the surface of the second pole tip 222. One of the advantages that is achieved by this structure is that the second yoke 221 can be directly linked at the surface of the second pole tip 222 without having to provide an indented portion or the like at the upper surface of the non-magnetic insulating film 26. This ensures that the second yoke 221 can be adhered to the second pole tip reliably and easily, even when the track width of the second pole tip 222 is reduced. Furthermore, since the front end portion of the second yoke 221 has a track width W22 that is larger than the track width W21 of the second pole tip 222, the write capability does not deteriorate even when the track width W21 of the second pole tip 222 is reduced. In addition, since the second yoke 221 is adhered to the upper surface of the non-magnetic insulating film 26 at both ends in the direction of the track width, ample adhesion surface area and sufficient adhesion strength are assured even with the track width W21 of the second pole tip 222 reduced.

Another advantage is that through flattening the non-magnetic insulating film 26, a flat base for forming the coil film 24 is achieved. In other words, the coil film 24 and its supporting insulating film 25 can be formed on the flattened non-magnetic insulating film 26. Consequently, since the coil film formation process can be executed on the flattened non-magnetic insulating film 26, disconnection and shorting of the coil film 24 that tend to occur when forming the coil film 24 in a stepped area can be avoided.

The write element 2 is laminated on the MR read element 3. In this structure, the second shield film 32 is also used as the first yoke 211 of the write element 2. Since the first pole tip 212 is provided projecting above the first yoke 211, the track width W11 of the first pole tip 212 can be reduced while maintaining the width of the second shield film 32 at the dimension that is required in order to protect the MR read element 3.

According to the present invention, the inductive thin film magnetic transducer constituting the write element 2 may be any one of the various types of elements that have been proposed to date or that will be proposed in the future. The MR read element 3 may be constituted of any of the various types of elements that have been proposed to date or that will be proposed in the future, such as an element employing a magnetic anisotropic magnetoresistive film such as a permalloy film and an element that utilizes the giant magnetoresistance effect typically employing a spin valve film, a tunnel film or the like. The write element 2 and the MR read element 3 are mounted on a slider. The slider may be provided with one or more rails, or a slider with no rails may be used.

Next, in reference to FIGS. 4 to 19, a method for manufacturing a thin film magnetic head according to the present invention is explained. However, the method for manufacturing a magnetic head according to the present invention is not limited to that illustrated in the figures. For instance, the thin film magnetic head may be manufactured by employing the manufacturing methods disclosed in Japanese Unexamined Patent Publication No. 262519/1995, Japanese Unexamined Patent Publication No. 225917/1995 and Japanese Unexamined Patent Publication No. 28626/1994. While the manufacturing processes are implemented on a wafer, only one of the many magnetic head elements formed on a wafer is extracted for illustration in the figures.

Figure 4:
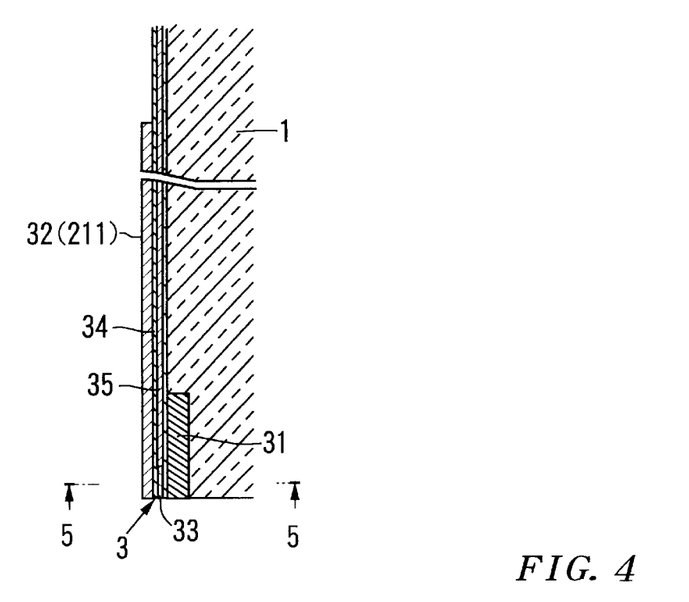
FIG. 4 is a cross section illustrating one step in the manufacturer method according to the present invention.
Figure 5:
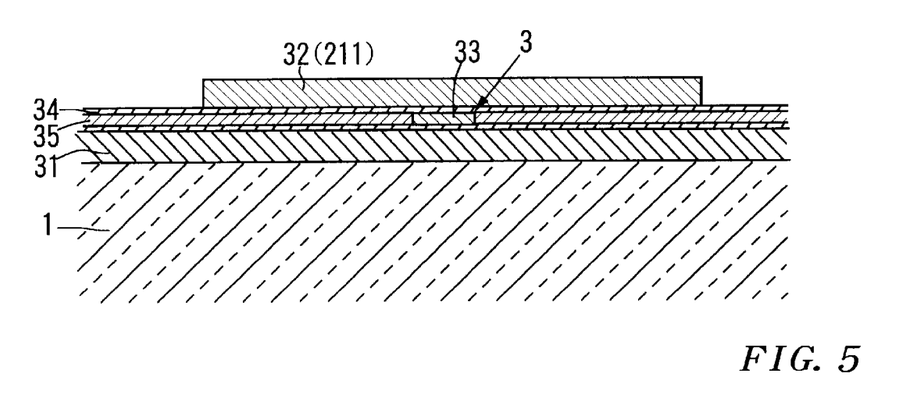
FIG. 5 is an enlarged cross section through line 5—5 in FIG. 4.

FIG. 4 is a cross section illustrating one step in the manufacturing method according to the present invention and FIG. 5 is an enlarged cross section along line 5—5 in FIG. 4. In the process illustrated in FIGS. 4 and 5, the MR read element 3 has already been formed on the body 1. The second shield film 32 of the MR read element 3 is formed at the surface of the inorganic insulating film 34. The second shield film 32 may be constituted of permalloy or a material having a higher resistivity than that of permalloy, as explained earlier. The purposes achieved by doing so and its specific examples have already been explained.

Figure 6:
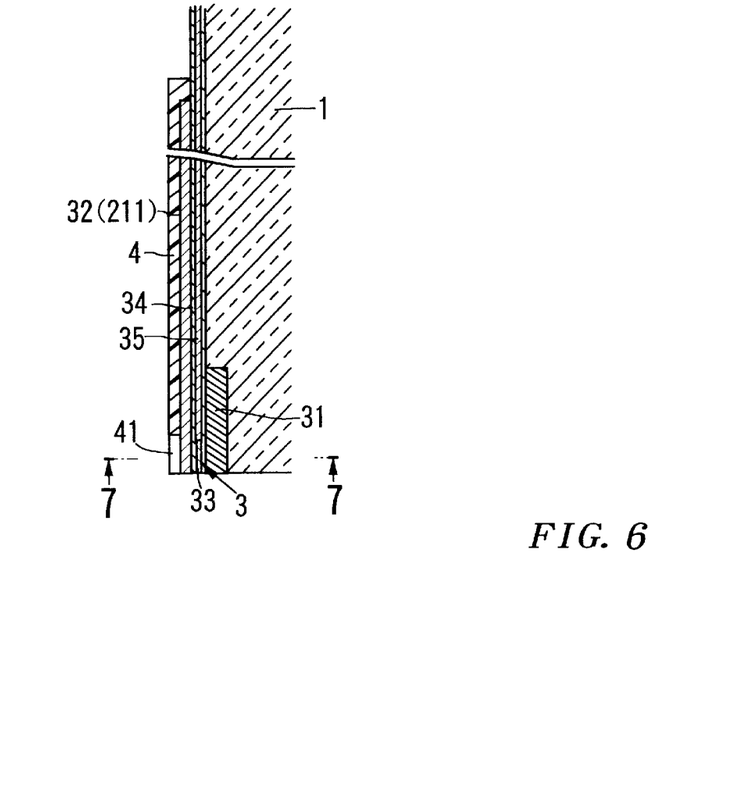
FIG. 6 is a cross section illustrating a step following the step illustrated in FIGS. 4 and 5.
Figure 7:
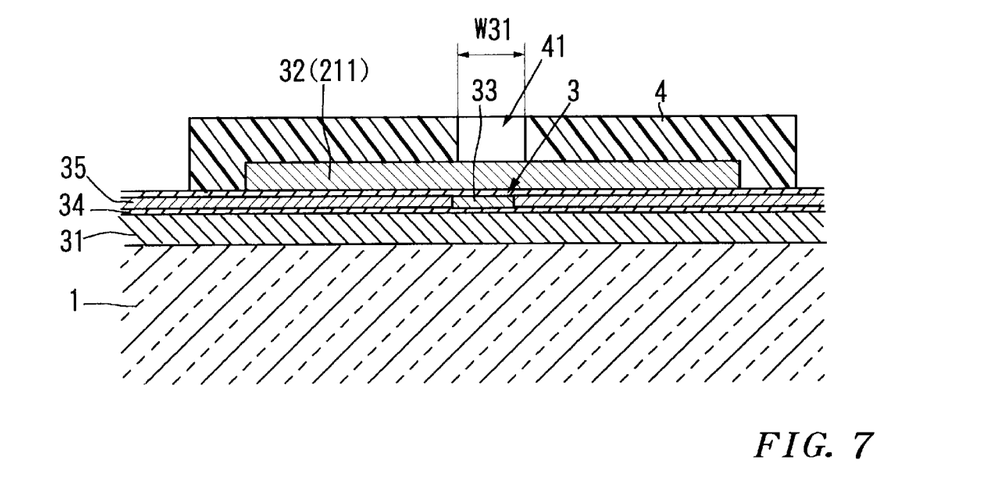
FIG. 7 is an enlarged cross section through line 7—7 in FIG. 6.

Next, as illustrated in FIGS. 6 and 7, a frame 4 is formed on the second shield film 32. The frame 4, which is formed through a photolithography process, is provided with an inner pattern 41 for defining a pattern at the pole tips. The width W31 of the inner pattern 41 determines the track widths W11 and W21 of the pole tips (see FIGS. 2 and 3).

Figure 8:
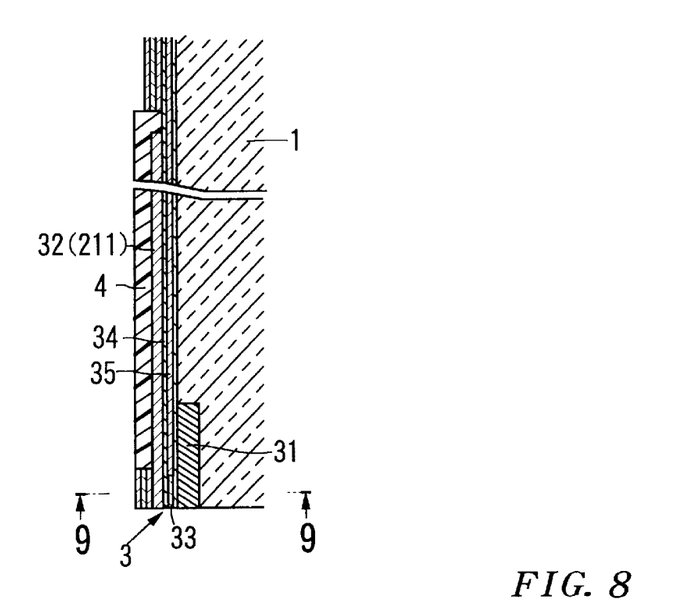
FIG. 8 is a cross section illustrating a step following the step illustrated in FIGS. 6 and 7.
Figure 9:
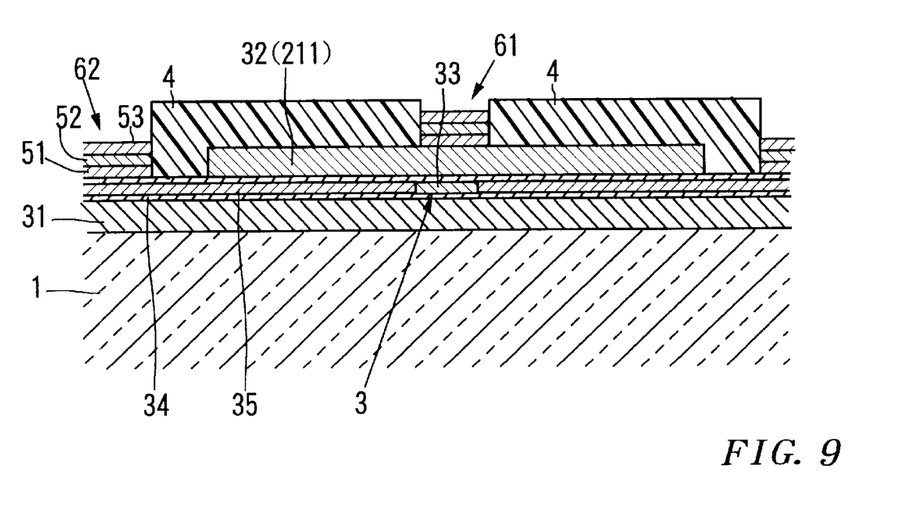
FIG. 9 is an enlarged cross section through line 9—9 in FIG. 8.

Then, as illustrated in FIGS. 8 and 9, laminated films 61 and 62 comprising a first magnetic film 51, a non-magnetic film 52 and a second magnetic film 53 are adhered to the inner pattern 41 and an outer pattern defined by the frame 4. These films may be formed through frame plating.

At least either the first magnetic film 51 or the second magnetic film 53 is constituted of a material having a higher saturation magnetic flux density than that of permalloy. The purposes achieved by doing so and its specific examples have already been explained. The non-magnetic film 52 may be constituted of a conductive non-magnetic material such as Au, Cu, NiP or the like.

Figure 10:
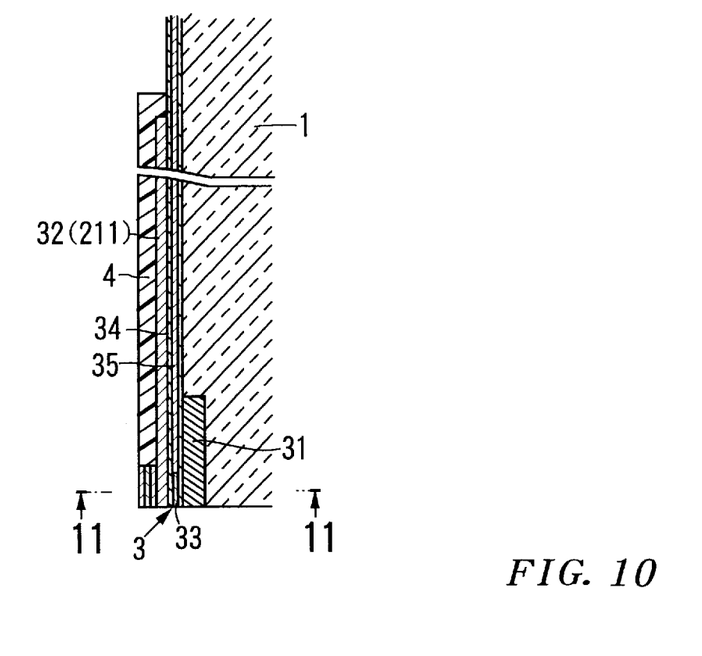
FIG. 10 is a cross section illustrating a step following the step illustrated in FIGS. 8 and 9.
Figure 11:
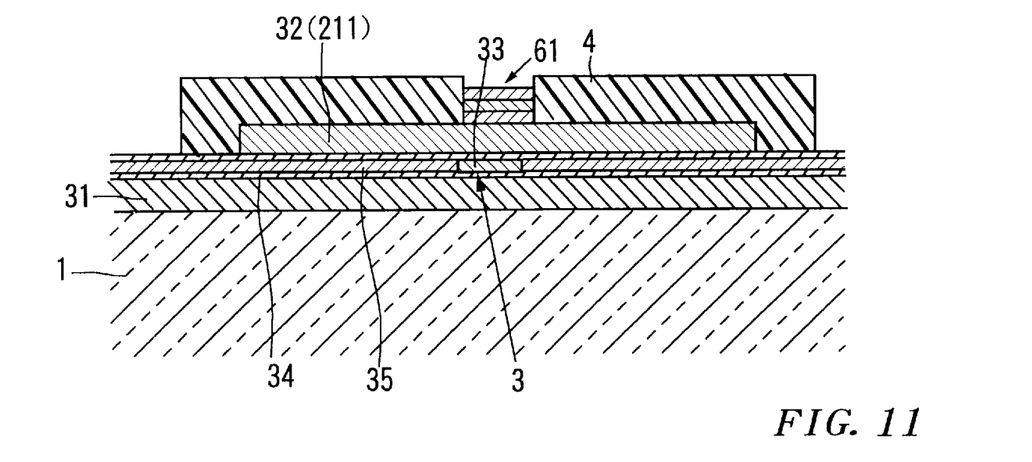
FIG. 11 is an enlarged cross section through line 11—11 in FIG. 10.

Now, as illustrated in FIGS. 10 and 11, the laminated film 62 adhered to the outer pattern 42 is removed while leaving intact the laminated film 61 adhering to the inner pattern 41. In the laminated film 61 adhered to the inner pattern 41, the first magnetic film 51 adhered on the second shield film 32 constitutes the first pole tip 212, the non-magnetic film 52 laminated over it constitutes the gap film 23 and the second magnetic film 53 laminated over that constitutes the second pole tip 222. Through these manufacturing processes, since the frame 4 can be formed while the level differences are less pronounced during the process of lamination, the track widths W11 and W21 of the first pole tip 212 and the second pole tip 222 can be set at extremely small values with a high degree of accuracy determined during the photolithography process.

Moreover, since the alignment of the first pole tip 212, the gap film 23 and the second pole tip 222 is implemented through the photolithography process, the positions of the first pole tip 212 and the second pole tip 222 can be aligned with ease with a high degree of accuracy.

Figure 12:
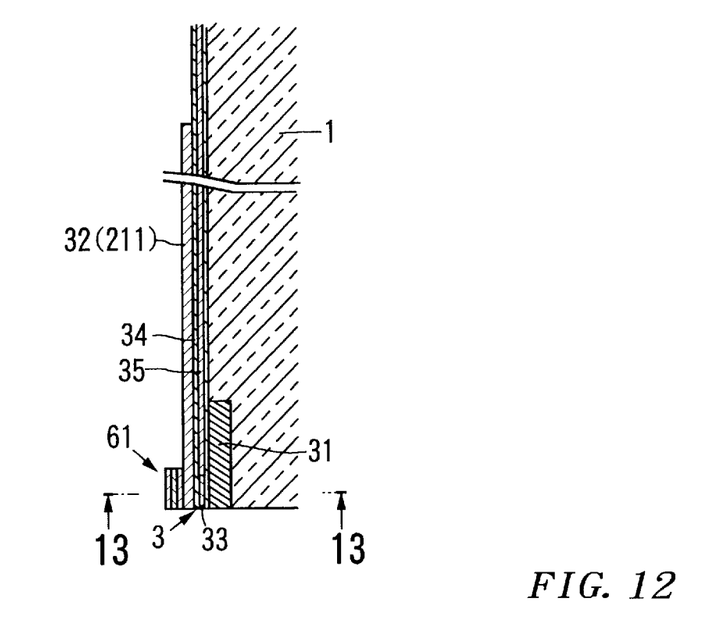
FIG. 12 is a cross section illustrating a step following the step illustrated in FIGS. 10 and 11.
Figure 13:
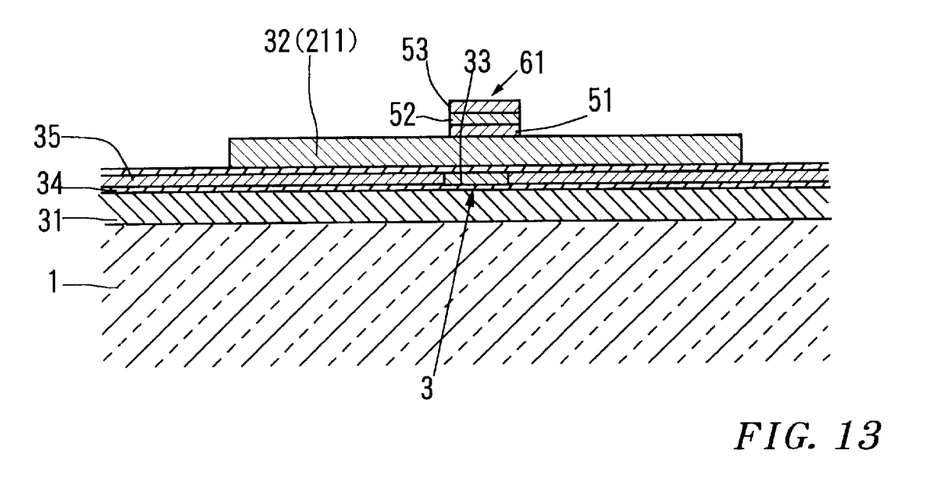
FIG. 13 is an enlarged cross section through line 13—13 in FIG. 12.

Next, as illustrated in FIGS. 12 and 13, the frame 4 is removed. The frame 4 may be removed by using an organic solvent or a resist-removing solution.

Figure 14:
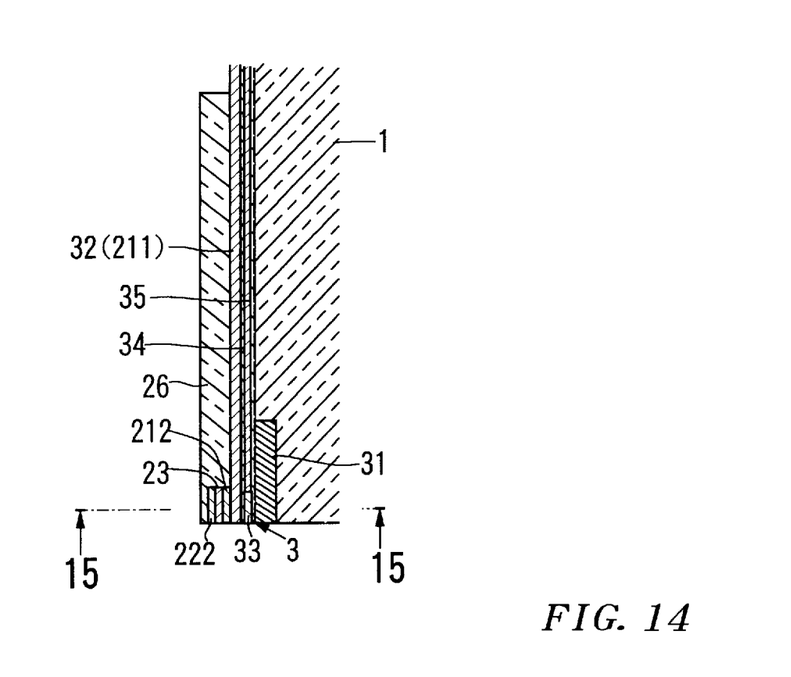
FIG. 14 is a cross section illustrating a step following the step illustrated in FIGS. 12 and 13.
Figure 15:
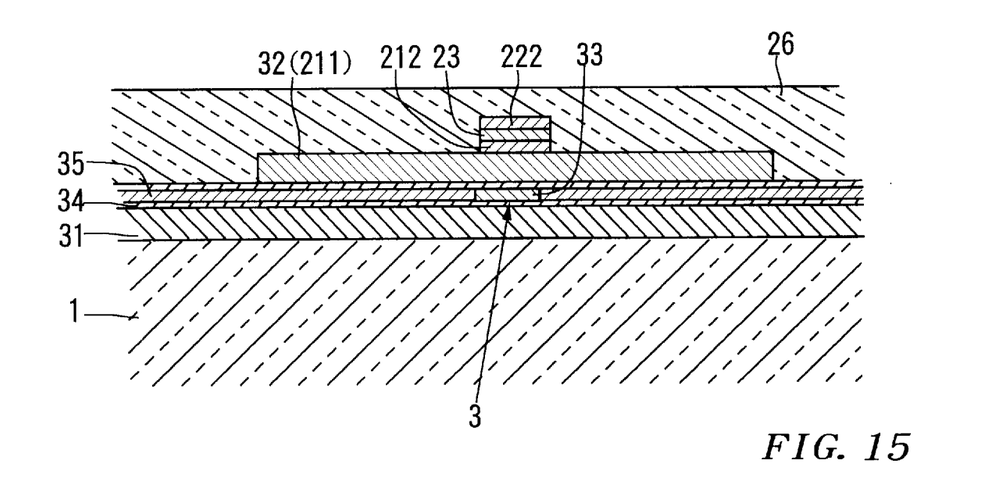
FIG. 15 is an enlarged cross section through line 15—15 in FIG. 14.

Then, as illustrated in FIGS. 14 and 15, the non-magnetic insulating film 26 that is to cover the first yoke 211 and the laminated film 61 is formed. The non-magnetic insulating film 26 may be formed through sputtering or the like.

Figure 16:
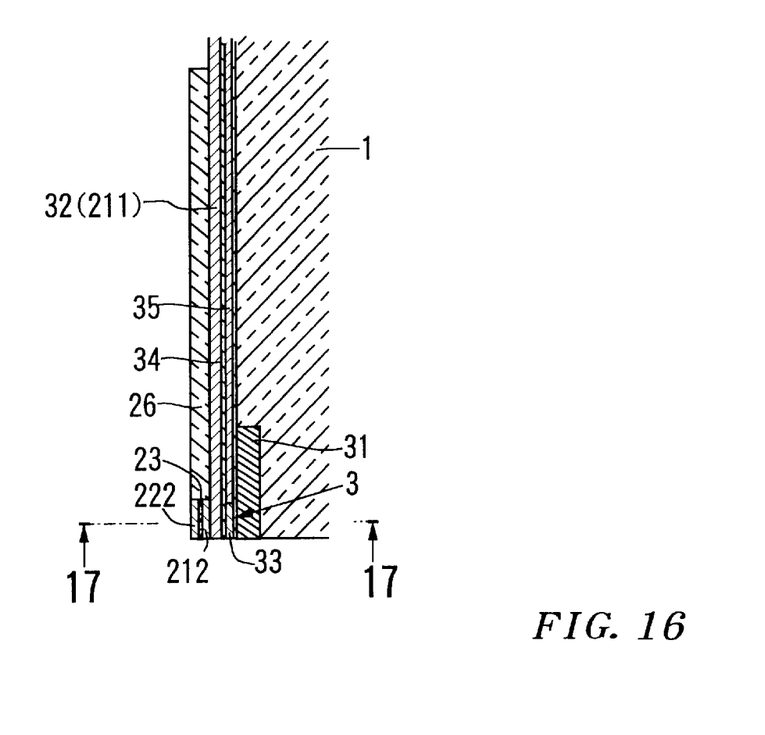
FIG. 16 is a cross section illustrating a step following the step illustrated in FIGS. 14 and 15.
Figure 17:
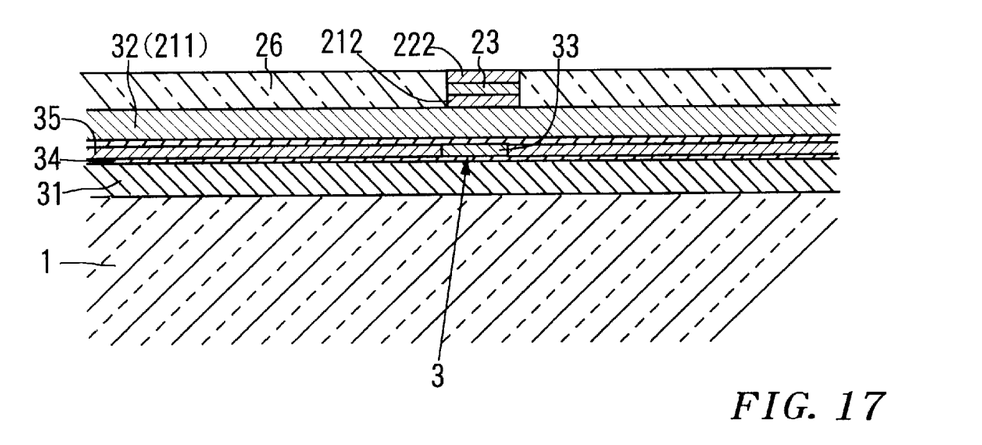
FIG. 17 is an enlarged cross section through line 17—17 in FIG. 16.

Next, as illustrated in FIGS. 16 and 17, the surface of the non-magnetic insulating film 26 is flattened and the surface of the second pole tip 222 is exposed. This flattening step may be implemented through polishing, ion beam milling or the like.

Figure 18:
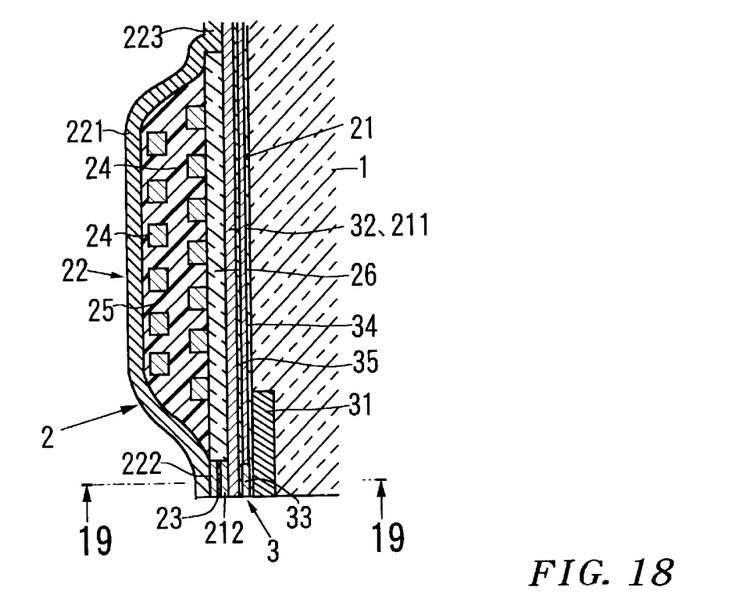
FIG. 18 is a cross section illustrating a step following the step illustrated in FIGS. 16 and 17.
Figure 19:
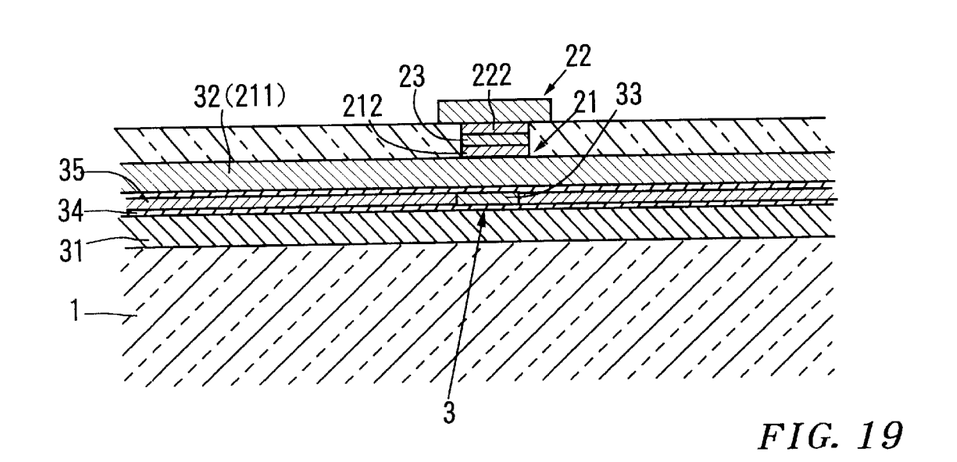
FIG. 19 is an enlarged cross section through line 19—19 in FIG. 18.

Next, as illustrated in FIGS. 18 and 19, the coil film 24 and its supporting insulating film 25 are formed on the flattened non-magnetic insulating film 26, and then the second yoke 221 is formed. During this process, since the flattened upper surface of the non-magnetic insulating film 26 constitutes a flat surface which is essentially the same as the surface of the second pole tip 222, the second yoke 221 can be directly linked at the surface of the second pole tip 222 without having to provide an indented portion or the like at the upper surface of the non-magnetic insulating film 26. Thus, even when the track width of the second pole tip 222 is reduced, the second yoke 221 can be adhered to the second pole tip 222 easily and reliably. As explained earlier, the second yoke 221 may be constituted of permalloy or a material having a higher resistivity than that of permalloy. The purposes achieved by doing so and its specific example have already been explained.

The second yoke 221 is adhered by ensuring that its front end portion has a track width W22 that is larger than the track width W21 of the second pole tip 222. In this structure, the write capability does not deteriorate even when the track width of the second pole tip 222 is reduced. In addition, since the two ends of the second yoke 221 in the direction of the track width are adhered to the upper surface of the non-magnetic insulating film 26, ample adhesion area and sufficient adhesion strength can be assured even with the track width W21 of the second pole tip 222 reduced. Furthermore, since the pole end portion (212, 23, 222) that determines the write characteristics has already been formed by the time the second yoke 221 is formed, the track width does not change during the formation of the second yoke 221.

Moreover, through flattening the non-magnetic insulating film 26, a flat base for forming the coil film 24 is achieved. In other words, the coil film 24 and its supporting insulating film 25 can be formed on the flattened non-magnetic insulating film 26. Consequently, since the coil film formation process can be executed on the flattened non-magnetic insulating film 26, disconnection and shorting of the coil film 24, which tend to occur when forming the coil film 24 in a stepped area, can be avoided.

While the present invention has been explained in detail by referring to specific preferred embodiments, it will be obvious to persons skilled in the art that a number of variations may be made in form and detail without departing from the essence and the scope of the present invention.

What is claimed is:

1. A thin film magnetic head including a write element having a film structure comprising:

a first yoke;

a first pole tip superimposed exclusively on a front end portion of said first yoke, with a width of said first pole tip being less than a width of said first yoke, and said width of said first pole tip defining a track width;

a gap layer superimposed exclusively on said first pole tip;

a second pole tip superimposed exclusively on said gap layer;

a non-magnetic insulating film superimposed on said first yoke, surrounding said first pole tip, said gap layer and said second pole tip; and a second yoke having a front end portion superimposed on said second pole tip;

wherein;

at least either said first pole tip or said second pole tip is constituted of a material selected from the group consisting of Fe—Co, Fe—M and Fe—Co—M, with said M representing at least one material selected from the group consisting of N, C, B, Si, Al, Ti, Zr, Hf, Mo, Ta and Nb, wherein at least either said first yoke or said second yoke is constituted of a material selected from the group consisting of Fe—Co type amorphous, Fe—M—N Fe—M—O, Fe—Co—M—N, Fe—Co—M—O and Fe—Co—N, with said M representing at least one material selected from the group consisting of B, Si, Al, Ti, Zr, Hf, Mo, Ta and Nb.

2. The thin film magnetic head according to claim 1, wherein at least either said first yoke or said second yoke is constituted of NiFe.

3. The thin film magnetic head according to claim 1, wherein a width of said second pole tip is less than a width of said front end portion of said second yoke.

4. The thin film magnetic head according to claim 1, further comprising:

a read element having a first shield film, a second shield film and a magnetoresistive element, with said magnetoresistive element provided between said first shield film and said second shield film, said second shield film constituting said first yoke of said write element.

* * * * *